US008908025B2

(12) United States Patent
Uemori et al.

(10) Patent No.: US 8,908,025 B2
(45) Date of Patent: Dec. 9, 2014

(54) IMAGE PROCESSING APPARATUS AND IMAGE PROCESSING METHOD

(75) Inventors: Takeshi Uemori, Tokyo (JP); Ohji Nakagami, Tokyo (JP); Takuya Kitamura, Tokyo (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 942 days.

(21) Appl. No.: 12/987,248

(22) Filed: Jan. 10, 2011

(65) Prior Publication Data
US 2011/0175993 A1 Jul. 21, 2011

(30) Foreign Application Priority Data

Jan. 19, 2010 (JP) ................................. 2010-008989

(51) Int. Cl.
*H04N 7/18* (2006.01)
*H04N 19/60* (2014.01)
(Continued)

(52) U.S. Cl.
CPC ... *H04N 19/00569* (2013.01); *H04N 19/00775* (2013.01); *H04N 5/2356* (2013.01); *H04N 19/0089* (2013.01); *H04N 19/00066* (2013.01); *G06T 5/003* (2013.01); *G06T 5/50* (2013.01); *H04N 5/23212* (2013.01); *H04N 19/00545* (2013.01); *H04N 19/00436* (2013.01); *G06T 2207/30201* (2013.01); *H04N 19/00278* (2013.01); *H04N 19/002* (2013.01)
USPC .............................................. 348/79; 348/80

(58) Field of Classification Search
CPC ......... H01J 37/28; H01J 37/224; H01J 37/22; H04N 7/18
USPC ..................................................... 348/79–80
See application file for complete search history.

(56) References Cited

U.S. PATENT DOCUMENTS 5,126,962 A 6/1992 Chiang
5,289,289 A 2/1994 Nagasaki
(Continued)

FOREIGN PATENT DOCUMENTS

JP 63-292769 A 11/1988
JP 03-080676 A 4/1991
(Continued)

OTHER PUBLICATIONS

Irani, Michal et al., "Improving Resolution by Image Registration", *Graphical Models and Image Processing*, May 1991, pp. 231-239, vol. 53, No. 3, Academic Press, Inc., Jerusalem, Israel.
(Continued)

*Primary Examiner* — Andy Rao
(74) *Attorney, Agent, or Firm* — Wolf, Greenfield & Sacks, P.C.

(57) ABSTRACT

Provided is an image processing apparatus, including: a receiver to receive an all-in-focus image, which is generated through selecting, from focus face images, representative divided images being best-focused images among images in divided regions forming the focus face images, for each of the focus face images correspondingly to the divided regions, the focus face images being obtained through imaging an object at focus positions, and information about the focus positions of the focus face images including the representative divided images; and a predicted-image generator to generate a blur-compensation predicted image corresponding to each of the focus face images through performing a blur-compensation prediction using a blur function with respect to each of the representative divided images based on the information about the focus positions of the focus face images including the representative divided images, the information being received by the receiving means.

8 Claims, 11 Drawing Sheets

(51) Int. Cl.
| | |
|---|---|
| *H04N 5/235* | (2006.01) |
| *H04N 19/80* | (2014.01) |
| *H04N 19/117* | (2014.01) |
| *G06T 5/00* | (2006.01) |
| *G06T 5/50* | (2006.01) |
| *H04N 5/232* | (2006.01) |
| *H04N 19/46* | (2014.01) |
| *H04N 19/50* | (2014.01) |
| *H04N 19/33* | (2014.01) |
| *H04N 19/176* | (2014.01) |
| *H04N 19/154* | (2014.01) |

(56) References Cited

U.S. PATENT DOCUMENTS

| | | | |
|---|---|---|---|
| 5,327,242 A | 7/1994 | Naimpally et al. | |
| 5,355,167 A | 10/1994 | Juri | |
| 5,369,439 A | 11/1994 | Matsuda et al. | |
| 5,442,399 A | 8/1995 | Asamura et al. | |
| 5,485,533 A | 1/1996 | Hatano et al. | |
| 5,933,193 A | 8/1999 | Niesen | |
| 5,959,672 A | 9/1999 | Sasaki | |
| 6,185,312 B1 | 2/2001 | Nakamura et al. | |
| 6,633,676 B1 | 10/2003 | Kleihorst et al. | |
| 8,310,531 B2 * | 11/2012 | Nandy | 348/79 |
| 2005/0100245 A1 | 5/2005 | Chen et al. | |
| 2006/0062308 A1 | 3/2006 | Staelin et al. | |
| 2007/0098068 A1 | 5/2007 | Kimata et al. | |
| 2007/0183072 A1 | 8/2007 | Lee | |
| 2007/0291847 A1 | 12/2007 | Shimauchi et al. | |
| 2008/0069469 A1 | 3/2008 | Yan et al. | |
| 2008/0165848 A1 | 7/2008 | Ye et al. | |
| 2008/0260043 A1 | 10/2008 | Bottreau et al. | |
| 2009/0010568 A1 | 1/2009 | Nakagami et al. | |
| 2009/0074061 A1 | 3/2009 | Yin et al. | |
| 2009/0080535 A1 | 3/2009 | Yin et al. | |
| 2009/0116760 A1 | 5/2009 | Boon et al. | |
| 2009/0252425 A1 | 10/2009 | Bruls et al. | |
| 2009/0262803 A1 | 10/2009 | Wang et al. | |
| 2010/0118963 A1 | 5/2010 | Nakagami et al. | |
| 2010/0183072 A1 | 7/2010 | Nakagami et al. | |
| 2011/0142356 A1 | 6/2011 | Uemori et al. | |
| 2012/0057777 A1 | 3/2012 | Uemori et al. | |
| 2012/0251014 A1 | 10/2012 | Watanabe et al. | |
| 2013/0120550 A1 * | 5/2013 | Chen et al. | 348/79 |
| 2013/0242219 A1 * | 9/2013 | Yun et al. | 349/43 |

FOREIGN PATENT DOCUMENTS

| | | |
|---|---|---|
| JP | 09-284760 A | 10/1997 |
| JP | 11-046361 A | 2/1999 |
| JP | 2000-316120 A | 11/2000 |
| JP | 2005-533320 A | 11/2005 |
| JP | 2006-197074 A | 7/2006 |
| JP | 2007-011977 A | 1/2007 |
| JP | 2010-172001 A | 8/2010 |

OTHER PUBLICATIONS

Baskurt et al., 3-Dimensional Image Compression by Discrete Cosine Transform. Signal Processing, Theories and Applications. Proceed Euro Signal Process Conf (EUSIPCO), Sep. 5-8, 1988;1:79-82.

Chan et al., Three-dimensional transform compression of images from dynamic studies. Proceed SPIE, SPIE, 1990;1232:322-6.

Chan et al., 3D-DCT Quantization as a Compression Technique for Video Sequences. IEEE, International Conference Sep. 1997, pp. 188-196, The Chinese University of Hong Kong, Hong Kong.

Maor et al., MPEG-2→H.264 Transcoding. Dec. 1, 2004, Technion—Israel Institute of Technology, SIPL H.264 Workshop.

Ramaswamy et al., A Mixed Transform Approach for Efficient Compression of Medical Images. IEEE Trans. Medic. Imaging, 1996;15(3): 343-352.

Roese et al., Interframe Cosine Transform Image Coding. IEEE Transac Commun, 1977;25(11):1329-39.

Urbano et al., 3-Dimensional medical image compression: A first approach to the application of the ADCT-ISO. Engineering in Medic. and Biol. Soc., Proceed. Ann. Intl. Conf. of IEEE, 1992;1219-20.

* cited by examiner

IMAGE PROCESSING APPARATUS AND IMAGE PROCESSING METHOD

CROSS REFERENCE TO RELATED APPLICATIONS

The present application claims priority under 35 U.S.C. §119 to Japanese Patent Application No. JP 2010-008989, filed in the Japan Patent Office on Jan. 19, 2010, the entire contents of which are incorporated herein by reference.

BACKGROUND OF THE INVENTION

1. Field of the Invention

The present invention relates to an image processing apparatus and an image processing method, which are capable of performing a compression encoding and a decoding with respect to image data.

2. Description of the Related Art

In resent years, there has been known a system to pick up an image, which has been captured by an optical microscope, in a digital form, and to save or display the image as a digital image. In the above-mentioned system, it is desirable that the picked-up digital image can be observed with operability equal to or higher than that of a real microscope.

For example, when a sample having some thickness is observed by a microscope optical system with a small depth of field, an operation of changing a focus position through rotating a slow-motion focus screw is necessary. In order to realize this operation in the above-mentioned system, a plurality of focus face images, which are obtained by imaging the same sample at a plurality of focus positions, are necessary. Thus, an enormous amount of image data is necessary to observe one sample, and hence, in the above-mentioned system, it is desirable to efficiently compress the image data.

For example, Japanese Patent Application Laid-open No. 2007-11977 (hereinafter, referred to as Patent Literature 1) discloses a compression method including using an inter-frame encoding with respect to a plurality of focus face images. In the inter-frame encoding, a difference is determined between frames adjacent to each other. In addition, Patent Literature 1 also refers to a compression method including using a predicted image, which is generated through performing a blur-compensation prediction with respect to a focus face image being the reference. For example, when a focus face image is desired to be compressed, a blur-compensation prediction, which depends on a distance between a focus face thereof and a focus face being the reference, is performed with respect to a reference focus face image. Then, difference data between the generated predicted image and the focus face image to be compressed is encoded (see, paragraphs [0030], [0033], and the like in Patent Literature 1).

SUMMARY OF THE INVENTION

However, in the inter-frame encoding method described in Patent Literature 1, in order to decode a focus face image at an arbitrary focus position, focus face images adjacent to each other have to be decoded. Thus, it takes a long time to perform the decoding process, which is not practical. Further, in the above-mentioned blur-compensation prediction, an image prediction is performed only in a blur direction. Therefore, when a blur-compensation prediction is performed based on one reference focus face image, it is difficult to generate a predicted image with high accuracy. As a result, difference data between the predicted image and the focus face image to be compressed is increased, and hence a compression rate is unfortunately lowered.

In view of the above-mentioned circumstances, there is a need for providing an image processing apparatus and an image processing method, which are capable of compression-encoding, at a high compression rate, a plurality of focus face images at different focus positions, and are further capable of decoding the plurality of focus face images at the different focus positions for a short processing time.

According to an embodiment of the present invention, there is provided an image processing apparatus including a receiving means and a predicted-image generating means. The receiving means receives the following: an all-in-focus image, which is generated through selecting, from a plurality of focus face images, representative divided images being best-focused images among images in a plurality of divided regions forming the focus face images, for each of the focus face images correspondingly to the divided regions, the plurality of focus face images being obtained through imaging an object at a plurality of focus positions; and information about the focus positions of the focus face images including the representative divided images. The predicted-image generating means generates a blur-compensation predicted image corresponding to each of the focus face images through performing a blur-compensation prediction using a blur function with respect to each of the representative divided images based on the information about the focus positions of the focus face images including the representative divided images, the information being received by the receiving means.

According to another embodiment of the present invention, there is provided an image processing apparatus including a receiver and a predicted-image generator. The receiver receives the following: an all-in-focus image, which is generated through selecting, from a plurality of focus face images, representative divided images being best-focused images among images in a plurality of divided regions forming the focus face images, for each of the focus face images correspondingly to the divided regions, the plurality of focus face images being obtained through imaging an object at a plurality of focus positions; and information about the focus positions of the focus face images including the representative divided images. The predicted-image generator generates a blur-compensation predicted image corresponding to each of the focus face images through performing a blur-compensation prediction using a blur function with respect to each of the representative divided images based on the information about the focus positions of the focus face images including the representative divided images, the information being received by the receiver.

In the image processing apparatus according to each of the above-mentioned embodiments, the blur-compensation prediction is performed with respect to each of the representative divided images being the best-focused images forming the all-in-focus image. Thus, it is possible to generate the blur-compensation predicted image corresponding to each of the focus face images with high accuracy. Therefore, for example, in such a manner that a differential image between the focus face image and the blur-compensation predicted image is generated, it is possible to compression-encode, at a high compression rate, the plurality of focus face images at the different focus positions.

The image processing apparatus may further include an all-in-focus image generating means and a differential image generating means. The all-in-focus image generating means generates the all-in-focus image through selecting the representative divided images based on luminance information of the divided region images. The differential image generating means generates a differential image between each of the focus face images and the blur-compensation predicted image corresponding to each of the focus face images, the blur-compensation predicted image being generated by the predicted-image generating means.

As described above, the blur-compensation predicted image corresponding to each of the focus face images is generated with high accuracy. Therefore, the data amount of differential images between the focus face images and the blur-compensation predicted images can be reduced. With this, it is possible to compression-encode the plurality of focus face images at the different focus positions at a high compression rate.

The all-in-focus image generating means may generate the all-in-focus image through selecting the representative divided images based on a contrast of each of the divided region images.

The predicted-image generating means may perform the blur-compensation prediction with respect to each of the representative divided images, and may perform a boundary-region blur-compensation prediction with respect to a boundary region between the plurality of representative divided images included in the all-in-focus image, the plurality of representative divided images being adjacent to each other. The boundary-region blur-compensation prediction is performed with respect to the boundary region between the representative divided images adjacent to each other, and hence it is possible, for example, to prevent a problem such as folding due to discontinuity in the boundaries between the representative divided images.

The image processing apparatus may further include a storage means. The storage means stores the all-in-focus image and the information about the focus positions of the focus face images including the representative divided images.

The storage means may store the differential image between each of the focus face images and the blur-compensation predicted image corresponding to each of the focus face images, the blur-compensation predicted image being generated by the predicted-image generating means. Further, the image processing apparatus may further include an additional-image generating means. The additional-image generating means generates an additional image of the differential image stored in the storage means and the blur-compensation predicted image corresponding to each of the focus face images, the blur-compensation predicted image being generated by the predicted-image generating means.

In the above-mentioned image processing apparatus, in such a manner that the additional image of the stored differential image and the blur-compensation predicted image corresponding to each of the focus face images, each of the focus face images is decoded. Thus, in order to decode an arbitrary focus face image, it is unnecessary to decode the other focus face images. With this, it is possible to decode the plurality of focus face images at the different focus positions for a short processing time.

According to still another embodiment of the present invention, there is provided an image processing method executed by an image processing apparatus. The image processing method includes receiving the following: an all-in-focus image, which is generated through selecting, from a plurality of focus face images, representative divided images being best-focused images among images in a plurality of divided regions forming the focus face images, for each of the focus face images correspondingly to the divided regions, the plurality of focus face images being obtained through imaging an object at a plurality of focus positions; and information about the focus positions of the focus face images including the representative divided images. The image processing method further includes generating a blur-compensation predicted image corresponding to each of the focus face images through performing a blur-compensation prediction using a blur function with respect to each of the representative divided images based on the received information about the focus positions of the focus face images including the representative divided images.

As described above, according the embodiments of the present invention, it is possible to compression-encode, at a high compression rate, the plurality of focus face images at the different focus positions, and it is further possible to decode the plurality of focus face images at the different focus positions for a short processing time.

DESCRIPTION OF PREFERRED EMBODIMENTS

Hereinafter, embodiments of the present invention will be described with reference to the drawings.

First Embodiment

Configuration of Image Processing System

Figure 1:
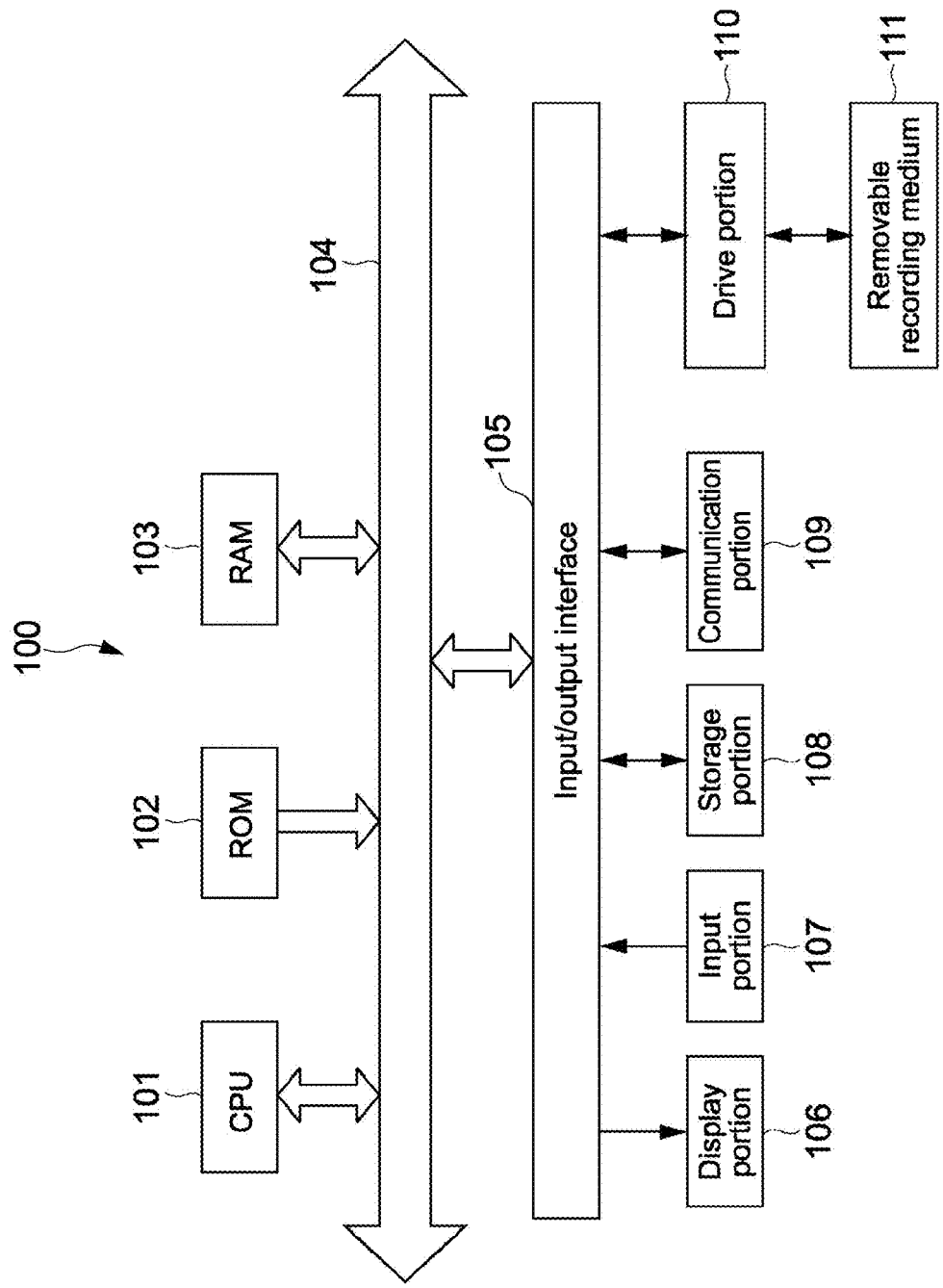
FIG. 1 is a block diagram showing a configuration of an image processing system including at least an image processing apparatus according to a first embodiment of the present invention.

FIG. 1 is a block diagram showing a configuration of an image processing system including at least an image processing apparatus according to a first embodiment of the present invention. As the image processing apparatus, for example, a PC (Personal Computer) 100 is used.

The PC 100 includes a CPU (Central Processing Unit) 101, a ROM (Read Only Memory) 102, a RAM (Random Access Memory) 103, an input/output interface 105, and a bus 104 to connect those components to each other.

To the input/output interface 105, a display portion 106, an input portion 107, a storage portion 108, a communication portion 109, a drive portion 110, and the like are connected.

The display portion 106 is, for example, a display device using liquid crystal, EL (Electro-Luminescence), or a CRT (Cathode RayTube).

The input portion 107 includes a pointing device, a keyboard, a touch panel, and the other operation apparatuses. In a case where the input portion 107 includes a touch panel, the touch panel may be integrated with the display portion 106.

The storage portion 108 is a nonvolatile memory, for example, an HDD (Hard Disk Drive), a flash memory, or another solid memory.

The drive portion 110 is, for example, a device capable of driving a removable recording medium 111 such as an optical recording medium, a floppy (registered mark) disk, a magnetic recording tape, or a flash memory. Meanwhile, the above-mentioned storage portion 108 is often used as a device installed in advance in the PC 100, which mainly drives a non-removable recording medium.

The communication portion 109 is a modem, a router, or another communication equipment for communicating to other devices, which can be connected to an LAN (Local Area Network), a WAN (Wide Area Network), and the like. The communication portion 109 may perform a wired communication or a wireless communication. The communication portion 109 is often used separately from the PC 100.

[Image to be Compression-Encoded]

Figure 2:
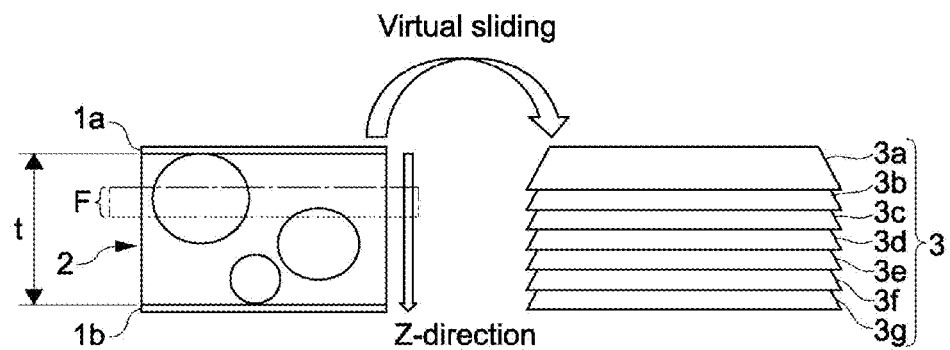
FIG. 2 is an explanatory view for a plurality of focus face images, which are compression-encoded by a PC shown in FIG. 1.
Figure 3:
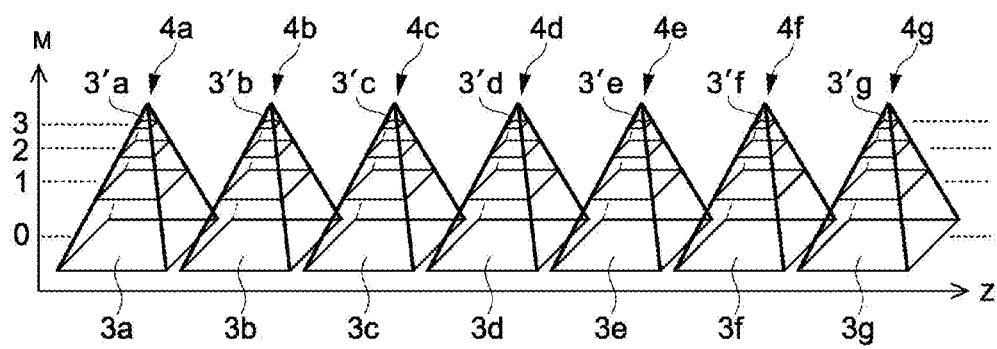
FIG. 3 is an explanatory view for the plurality of focus face images, which are compression-encoded by the PC shown in FIG. 1.

FIG. 2 and FIG. 3 are explanatory views for a plurality of focus face images, which are to be compression-encoded by the PC 100 according to the first embodiment.

For example, by a scanner apparatus or the like (not shown) having an optical microscope function, an object to be observed 2 is imaged. In this case, the object to be observed 2 is held between two microscope slides 1*a* and 1*b*. As shown FIG. 2, a depth of field F being a range in which a focused image is obtained in the optical microscope, is smaller than a thickness t of the object to be observed 2. In view of this, the object to be observed 2 is imaged at different focus positions in a thickness direction (Z-direction of FIG. 2) of the object to be observed 2, the thickness direction being a focus direction of the optical microscope. With this, there are generated a plurality of focus face images 3, which are focused in different regions. The plurality of focus face images 3 are appropriately output, and thus an operation similar to an operation of changing a focus position through rotating the slow-motion focus screw of the optical microscope can be realized.

Although seven focus face images 3*a* to 3*g* are shown in FIG. 2, the number of focus face images 3 may be appropriately set. For example, about several tens or more of focus face images 3 may be generated. It should be noted that the process of generating the focus face images 3 as described above is called "virtual sliding."

Further, as shown in FIG. 3, image pyramid structures 4*a* to 4*g* are generated with respect to the respective focus face images 3*a* to 3*g*. Those image pyramid structures 4*a* to 4*g* are image groups each generated at different resolution ratios with respect to the respective focus face images 3*a* to 3*g*. The Z-axis being the horizontal axis of FIG. 3 indicates a focus direction axis, and the M-axis being the vertical axis of FIG. 3 indicates a image magnification ratio (resolution ratio) direction axis.

At the lowest layers (M=0) of the image pyramid structures 4*a* to 4*g*, there are arranged focus face images 3*a* to 3*g* each having the largest size, respectively. At the highest layers (M=3) of the image pyramid structures 4*a* to 4*g*, there are arranged focus face images 3'*a* to 3'*g* each having the smallest size, respectively. The resolution ratio of the focus face images 3*a* to 3*g* each having the largest size is, for example, 50×50 (Kpixel: kilo pixel), or 40×60 (Kpixel). The resolution ratio of the focus face images 3'*a* to 3'*g* each having the smallest size is, for example, 256×256 (pixel), or 256×512 (pixel).

The focus face images at a low magnification ratio such as M=1, 2, 3 are generated by reducing the size of the focus face images 3*a* to 3*g* at a high magnification ratio such as M=0 through a filter such as Lanczos, for example. As a reduction ratio, 1/2, 1/4, 1/8, or less may be selected, for example. Through a plurality of image pyramid structures 4*a* to 4*g*, an operation similar to an operation of changing the magnification ratio of an image captured by the optical microscope can be realized.

[Operation of Image Processing Apparatus]

The description will be made of an operation of the PC 100 being the image processing apparatus according to the first embodiment. The following processes by the PC 100 are realized through a cooperation of software stored in the storage portion 108, the ROM 102, or the like and a hardware resource for the PC 100. Specifically, in such a manner that the CPU 101 loads a program configuring the software, which is stored in the storage portion 108, the ROM 102, or the like, into the RAM 103 so as to perform the program, the following processes are realized.

[All In-Focus Image]

Figure 4:
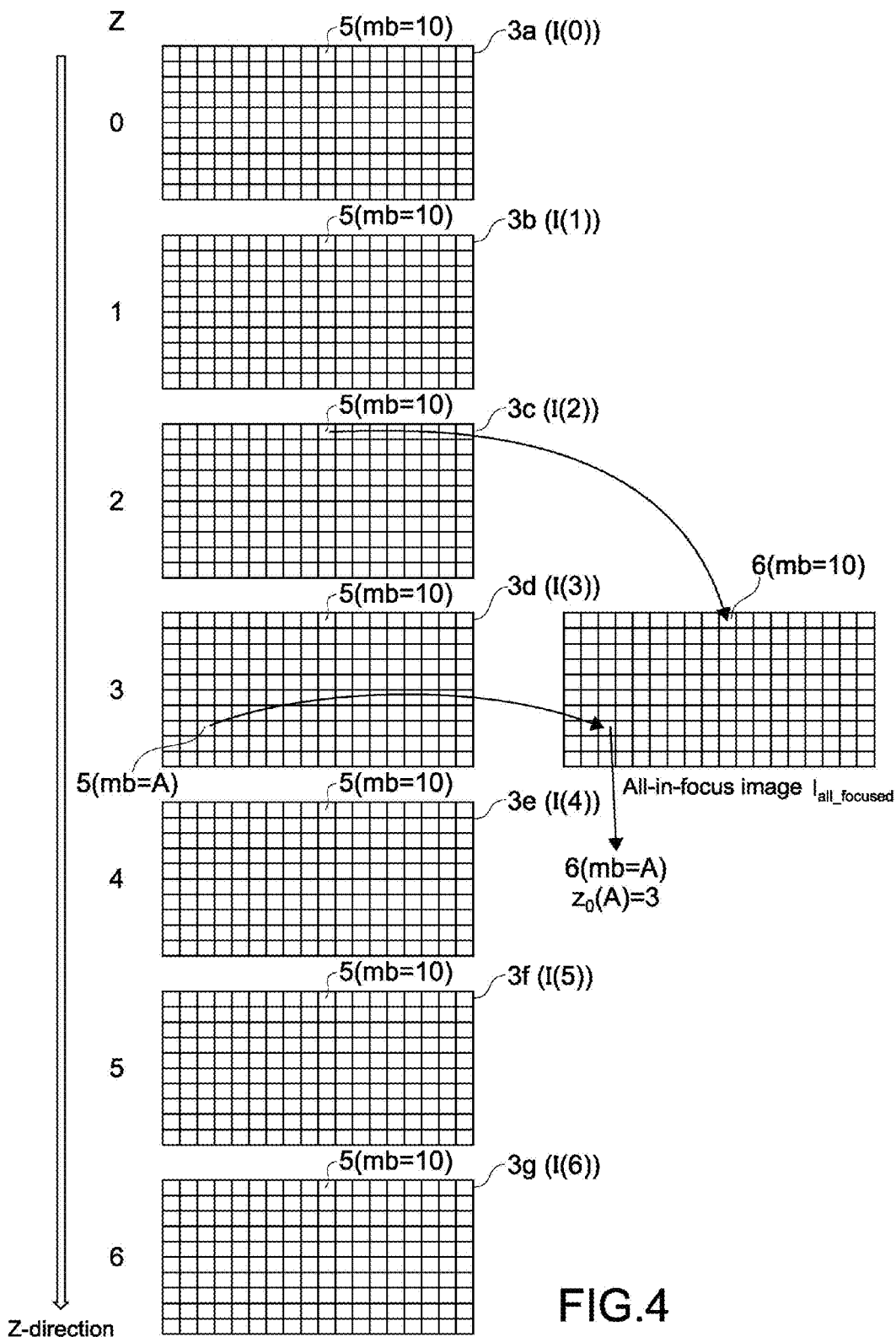
FIG. 4 is an explanatory view for an all-in-focus image, which is used for compression-encoding the plurality of focus face images shown in FIG. 2.

First, the description will be made of an all-in-focus image used for compression-encoding the plurality of focus face images 3 shown in FIG. 2. FIG. 4 is an explanatory view for the all-in-focus image.

As shown in FIG. 4, by the CPU 101, positional coordinates z (0 to 6) in the Z-direction are defined as pieces of focus position information of the focus face images 3*a* to 3*g*. The Z-direction of FIG. 4 corresponds to the thickness direction of the object to be observed 2 shown in FIG. 2. For example, the focus face image 3*a* having a positional coordinate z equal to 0 is an image picked up in such a state that a focus position thereof is determined on a side of the top portion, as seen in FIG. 2, of the object to be observed 2. Hereinafter, the focus face images 3*a* to 3*g* are referred to as the focus face images I (z), using the positional coordinates z.

Further, as shown in FIG. 4, by the CPU 101, each of the focus face images I (z) is divided into MBs (Macro blocks) 5 being images in a plurality of divided regions. Although the size of the MBs 5 is typically 16×16 (pixel), for example, 8×8 (pixel) may be appropriately set. Each of the MBs 5 is provided with a number mb as two-dimensional positional information. For example, as shown in FIG. 4, MBs 5 each having the same number mb (for example, mb=10) on the respective focus face images I (z) are MBs 5 each arranged at the same position on the respective focus face images I (z).

By the CPU 101, with respect to each of all numbers mb, there is selected a representative MB 6 as a best-focused representative divided image among the MBs 5 included in each of the focus face images I (z). Those representative MBs 6 are added to each other, to thereby generate an all-in-focus image $I_{all\_focused}$ shown in FIG. 4. As a method of selecting the representative MBs 6, for example, a contrast of each of the MBs 5 is calculated based on a luminance value of each pixel of the MBs 5, and the MBs 5 each having the largest contrast are selected as the representative MBs 6. Alternatively, the MBs 5 each having the maximum luminance value or the largest average luminance value may be selected as the representative MBs 6. In addition, it is possible to employ various focus detection methods based on luminance value information of the MBs 5.

Figure 5:
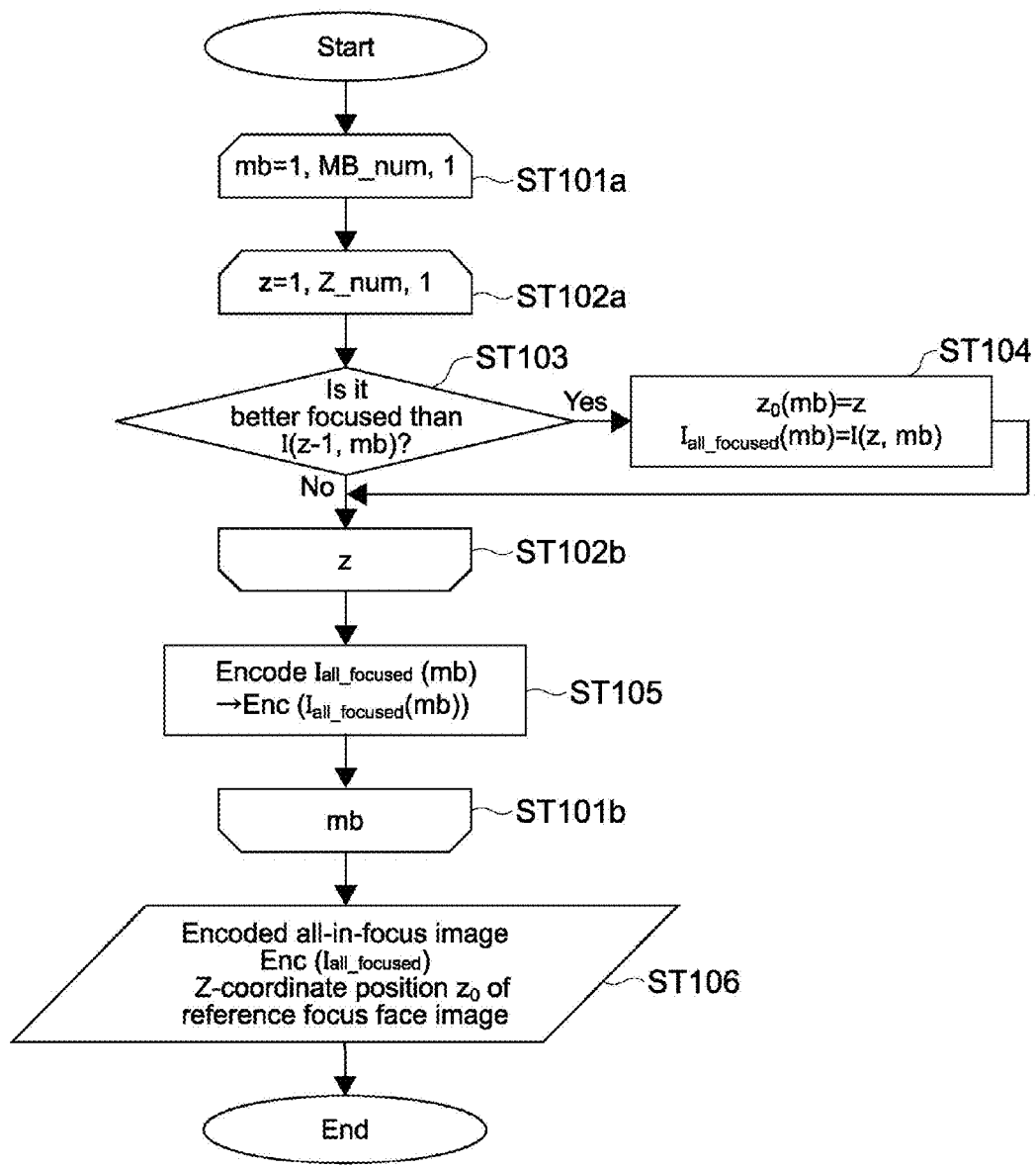
FIG. 5 is a flowchart showing processes by the PC for generating the all-in-focus image shown in FIG. 4.

FIG. 5 is a flowchart showing processes by the PC 100 for generating the all-in-focus image $I_{all\_focused}$. First, symbols shown in FIG. 5 will be described in the following.

MB_num_number of MBs 5 of each focus face image I (z)
Z_num_number of focus face images I (z)
I (z, mb) . . . MB 5 provided with number mb on focus face images I (z)
$z_0$ (mb) . . . positional coordinate z of focus face image I (z) including representative MB 6 provided with number mb
$I_{all\_focused}$ (mb) . . . representative MB 6 provided with number mb of all-in-focus image $I_{all\_focused}$
Enc ($I_{all\_focused}$ (mb)) . . . representative MB 6 provided with number mb of all-in-focus image $I_{all\_focused}$ after encoding
Enc ($I_{all\_focused}$) . . . all-in-focus image $I_{all\_focused}$ after encoding Steps 101*a* and 101*b* shown in FIG. 5 means that, starting from an MB 5 provided with the number mb=1, steps described between Steps 101*a* and 101*b* are repeated over all MBs of MB_num. Similarly, Steps 102*a* and 102*b* shown in FIG. 5 means that, starting from a focus face image I (1) having a positional coordinate of z=1, steps described between Steps 102*a* and 102*b* are repeated over all focus face images of z_num.

By the CPU 101, first, (I (1, 1)) being an MB 5 provided with the number mb=1 in a focus face image I (1) is output (Steps 101*a* and 102*a*). Then, it is determined whether or not the MB 5 of I (1, 1) is better focused than for an MB 5 of I (0, 1) (Step 103). In a case where it is determined that the MB 5 of I (1, 1) is better focused than for the MB 5 of I (0, 1) (Yes in Step 103), $z_0$ (1)=1 and $I_{all\_focused}$ (1)=I (1, 1) are set (Step 104). In a case where it is determined that the MB 5 of I (1, 1) is not better focused than for the MB 5 of I (0, 1) (No in Step 103), (I (2, 1)) being an MB 5 provided with the number mb=1 in the focus face image I (2) is next compared to I (0, 1) after returning to Step 102*a* (Step 102*b*).

In this manner, a representative MB 6 of the number mb=1 is selected, a positional coordinate $z_0$ (1) of the focus face image including the representative MB 6 is defined. Further, the representative MB 6 of the number mb=1 of the all-in-focus image is defined as $I_{all\_focused}$ (1) It should be noted that in Step 103, in a case where all MBs are determined as being No, I (0, 1) being an MB 5 provided with the number mb=1 in a focus face image I (0) becomes the representative MB 6, and the positional coordinate becomes $z_0$ (1)=0.

In Step 105, $I_{all\_focused}$ (1) is encoded, to thereby generate Enc ($I_{all\_focused}$ (1)). Returning to Step 101*a*, the steps between Steps 102*a* and 102*b* are performed with respect to an MB 5 provided with the number mb=2, and a representative MB 6 of $I_{all\_focused}$ (2) and a positional coordinate $z_o$ (2) of the focus face images I (z) including that representative MB 6 are set. Then, $I_{all\_focused}$ (2) is encoded. As described above, with respect to each of all MBs of the numbers mb, $I_{all\_focused}$ (mb) being a representative MB 6 and a positional coordinate $z_0$ (mb) of a focus face image I (z) including that representative MB 6 are calculated, and each $I_{all\_focused}$ (mb) is encoded.

In Step 106, an encoded all-in-focus image Enc ($I_{all\_focused}$) is generated, and then stored in the storage portion 108 or the like together with the positional coordinates $z_0$ (mb) regarding the representative MBs 6 provided with the respective numbers mb.

It should be noted that in order to save a recording capacity, pixel values of the all-in-focus image $I_{all\_focused}$ may be encoded by a well-known compression method such as a JPEG (Joint Photographic Experts Group) or an MPEG (Moving Picture Experts Group). Further, the positional coordinates $z_0$ (mb) may be encoded through using a lossless encoding or the like.

It should be noted that it is possible to use a PC or the like other than the PC 100 to generate the encoded all-in-focus image Enc ($I_{all\_focused}$) and then the all-in-focus image Enc ($I_{all\_focused}$) may be stored in the storage portion 108 of the PC 100.

[Compression Encoding of Focus Face Image]

Figure 6:
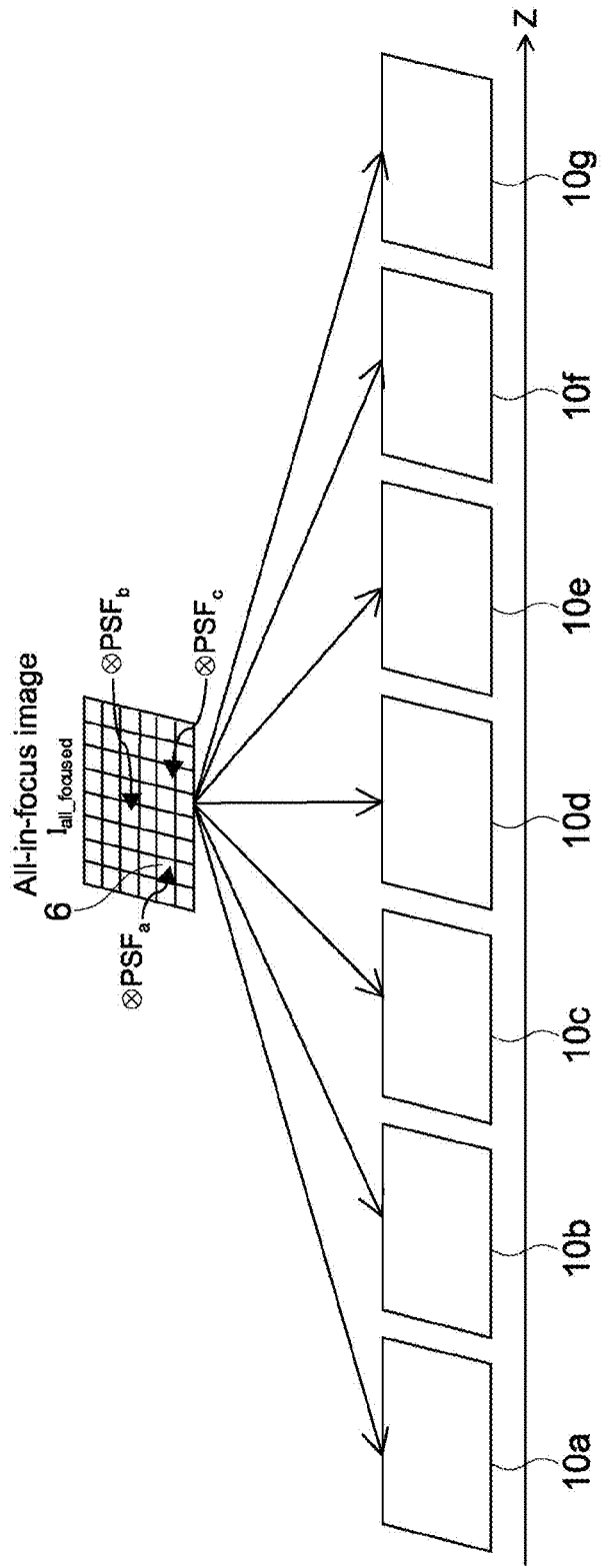
FIG. 6 is an explanatory view for an outline of the compression encoding of the plurality of focus face images shown in FIG. 2.

FIG. 6 is an explanatory view for an outline of the compression encoding of the focus face images I (z) (z=0 to 6) according to the first embodiment. As shown in FIG. 6, with respect to each of the representative MBs 6 of the all-in-focus image $I_{all\_focused}$, a blur compensation filter (PSFa, PSFb, PSFc) depending on each of the representative MBs 6 is applied. Thus, blur-compensation predicted images (not shown) respectively corresponding to the focus face images I (z) are generated. A difference between each of the focus face images I (z) and each of the corresponding blur-compensation predicted images is calculated. The differential images 10*a* to 10*g* thus obtained are stored in the storage portion 108 or the like. With this, each of the focus face images I (z) is compression-encoded. This will be described in the following in details.

Figure 7:
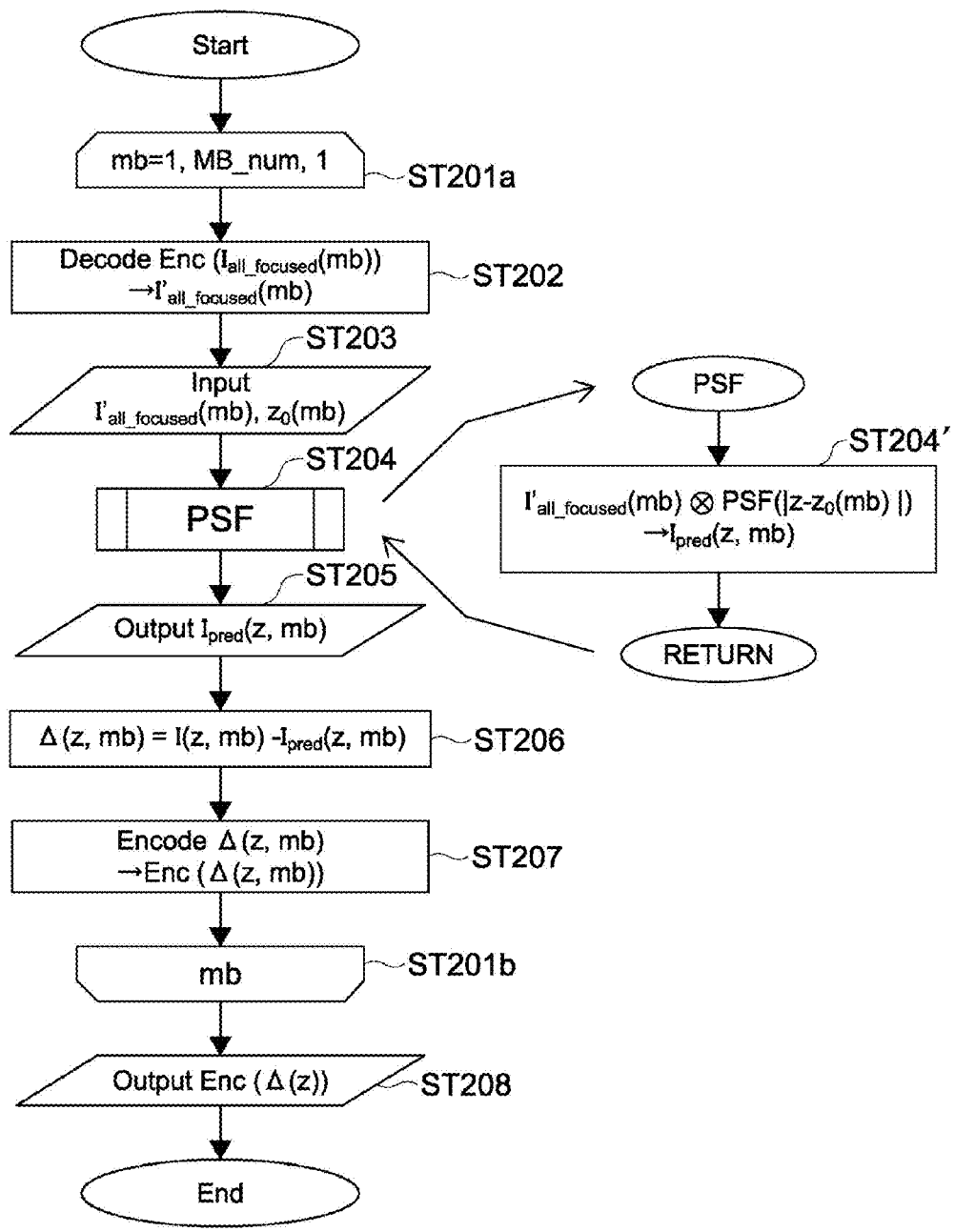
FIG. 7 is a flowchart showing processes by the PC for compression-encoding the plurality of focus face images shown in FIG. 2.
Figure 8:
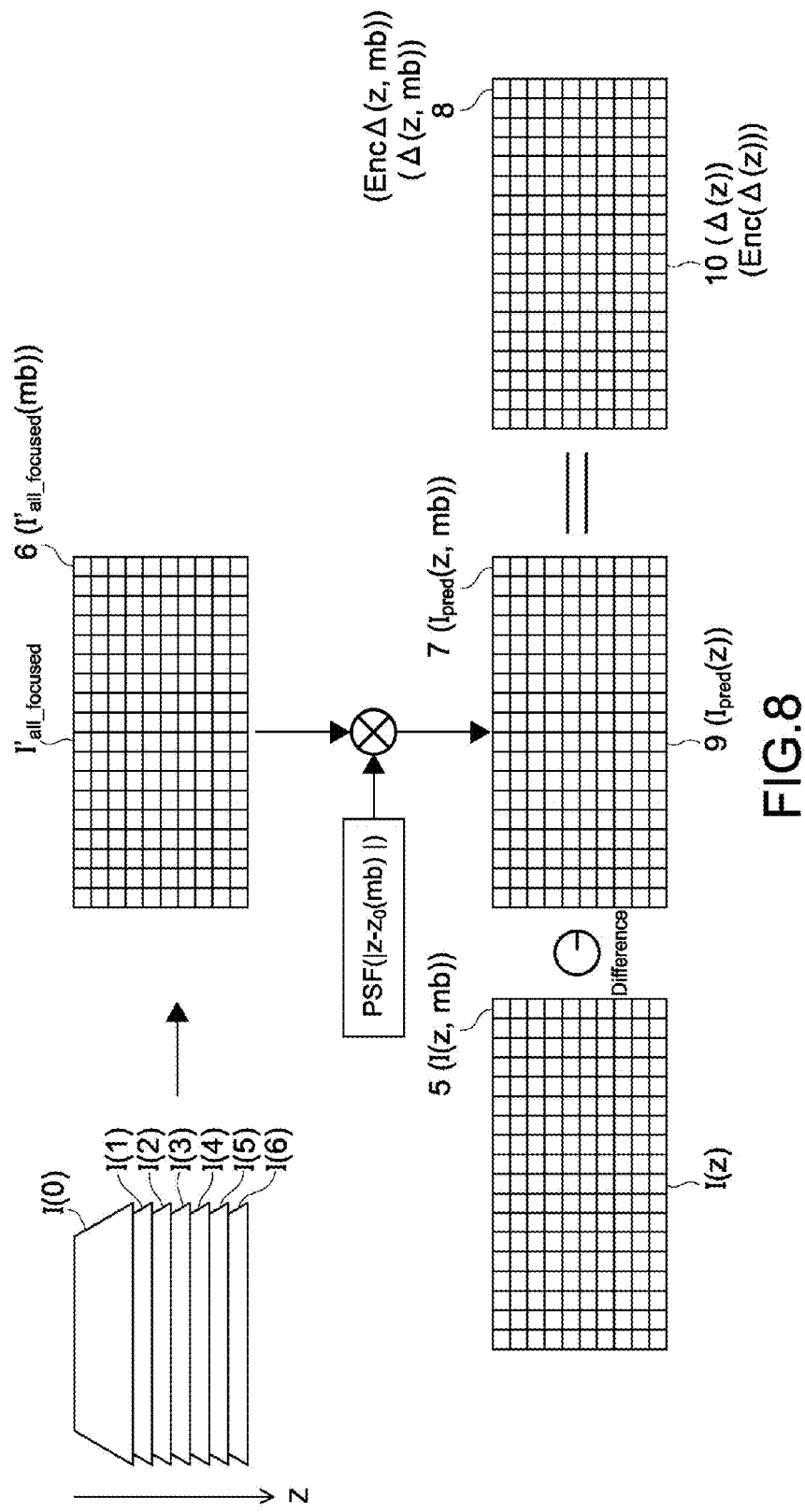
FIG. 8 is an explanatory view for the compression encoding of the plurality of focus face images shown in FIG. 2.

FIG. 7 is a flowchart showing processes by the PC 100 for compression-encoding each of the focus face images I (z). FIG. 8 is an explanatory view for the above-mentioned compression encoding.

First, by the CPU 101, Enc ($I_{all\_focused}$ (mb)) being a representative MBs 6 provided with a number mb in the all-in-focus image Enc ($I_{all\_focused}$) encoded and saved in the storage portion 108 or the like in Step 106 shown in FIG. 5 is encoded (Step 202). The decoded Enc ($I_{all\_focused}$ (mb)) is referred to as I'all_focused (mb).

The decoded I'all_focused (mb) and a positional coordinate $z_0$ (mb) regarding the representative MB 6 provided with the number mb stored in the storage portion 108 or the like are output (Step 203). Then, with respect to I'$_{all\_focused}$ (mb), a blur-compensation prediction is performed based on the positional coordinate $z_0$ (mb) (Step 204).

As shown in Step 204' of FIG. 7, the blur-compensation prediction is performed in such a manner that a blur compensation filter PSF (|z−$z_0$ (mb)|) depending on a Z-coordinate displacement |z−$z_0$ (mb)| of the positional coordinate z of the focus face image I (z) to be encoded and the positional coordinate $z_0$ (mb) of the representative MB 6 is applied to I'$_{all\_focused}$ (mb). With this, Ipred (z, mb) is output as a blur-compensation predicted MB 7 (Step 205).

The blur compensation filter PSF (|z−$z_0$ (mb)|) will be described in details. The blur-compensation prediction is expressed by the following PSF (Point Spread Function), using an optical parameter determined in advance, and an allowed circle of confusion radius R (z) depending on the above-mentioned Z-coordinate displacement |z−$z_0$ (mb)|.

$$R(z,mb)=\alpha \cdot Z\_pitch \cdot z-z_0(mb)|+\beta \qquad \text{[Expression 1]}$$

Where, z_pitch is an imaging interval in the focus direction (Z-direction of FIG. 8), that is, an interval between focus face images I (z) adjacent to each other. The imaging interval is, for example, about several μms. Further, α and β are coefficients defined by a relation between an optical system and an imaging device.

Using R (z, mb), the blur compensation filter PSF (|z−z₀ (mb)|) is expressed by the following expression when the blur compensation filter PSF (|z−z₀ (mb)|) is indicated by PSF (x, y, z, mb).

$$PSF(x, y, z, mb) = \frac{1}{\pi R(z, mb)^2} \exp\left[-\frac{(x+x_0)^2 + (y+y_0)^2}{R(z, mb)^2}\right]$$ [Expression 2]

π . . . circumference ratio
(x, y) . . . coordinate of filter
(x0, y0) . . . central coordinate of filter As described above, when the blur compensation filter PSF (x, y, z, mb) is applied to I'$_{all\_focused}$ (mb), Ipred (z, mb) being the blur-compensation predicted MB 7 is output. That is expressed by the following expression.

$$I_{pred}(z,mb) = I'_{all\_focused}(mb) \circledx PSF(x,y,z,mb)$$ [Expression 3]

By the CPU 101, a difference is calculated between the output Ipred (z, mb) being the blur-compensation predicted MB 7 and I (z, mb) being the MB 5 of the focus face image I (z) to be compressed. With this, Δ (z, mb) is calculated as a differential MB 8, and then is stored in the storage portion 108 or the like (Step 206). That is expressed by the following expression.

$$\Delta(z,mb) = I(z,mb) - I_{pred}(z,mb)$$ [Expression 4]

As described above, Δ (z, mb) is recorded as the differential MB 8, and hence, in comparison with data of I (z, mb) being the MB 5 of the focus face image I (z) before the compression, data amount can be significantly reduced. When various encoding methods such as a frequency conversion technique and a lossless compression technique are applied to this Δ (z, mb), further high compression thereof can be achieved (Step 207). In Step 207, Δ (z, mb) after the encoding is referred to as Enc (Δ (z, mb)).

Through returning to Step 201a from Step 201b, Ipred (z, mb) being the blur-compensation predicted MBs 7 are output in regard to all numbers mb, and Ipred (z) is generated as a blur-compensation predicted image 9 corresponding to the focus face image I (z) to be compressed. Further, Δ (z, mb) are generated as the differences MB 8 in regard to all numbers mb, and Δ (z) is generated as a differential image 10 corresponding to the focus face image I (z) to be compressed. In Step 208, the encoded Enc (Δ (z)) is output.

The above-mentioned blur compensation filter is capable of generating a predicted image only in the blur direction. Thus, for example, it is assumed that a blur compensation filter is applied to an entire focus face image I (z'), and thus a blur-compensation predicted image is generated, the focus face image I (z') being the reference. In this case, if another focus face image I (z) to be compressed includes a best-focused region (corresponding to representative MB 6), it is difficult to represent the best-focused region by the generated blur-compensation predicted image. As a result, differential data between the focus face image I (z) to be compressed and the blur-compensation predicted image is increased, and thus the compression rate is lowered.

However, in the PC 100 serving as the image processing apparatus according to the first embodiment, with respect to each of the representative MBs 6 being the best-focused images forming the decoded all-in-focus image I'$_{all\_focused}$, the blur compensation filter PSF (|z−z₀ (mb)|) is applied. With this, for each of the representative MBs 6, the blur-compensation predicted MB 7 is output. Thus, it is possible to generate the blur-compensation predicted image 9 corresponding to each of the focus face images I (z) with high accuracy. As a result, the data amount of the differential image 10 between the focus face image I (z) and the blur-compensation predicted image 9 can be significantly reduced. With this, it is possible to compression-encode a plurality of focus face images I (z) at different focus positions with high accuracy.

Second Embodiment

The description will be made through exemplifying a PC as an image processing apparatus according to a second embodiment of the present invention. In the following description, the description of the configuration of the PC 100 and the same portions as described in the first embodiment will be omitted or simplified.

The PC according to the second embodiment is one that decodes the plurality of focus face images I (z), which have been compression-encoded in the first embodiment. In a storage portion or the like of the PC according to the second embodiment, the encoded all-in-focus image Enc (I$_{all\_focused}$), which has been generated in Step 106 of FIG. 5, is stored. Further, in the storage portion or the like of the PC, the positional coordinate z₀ (mb) of the representative MB of each number mb of the all-in-focus image Enc (I$_{all\_focused}$) is stored. In addition, in the storage portion or the like, the encoded differential image Enc (Δ (z)) corresponding to each of the compressed focus face images I (z), which have been generated in Step 208 of FIG. 7, is stored.

[Decoding of Focus Face Image]

Figure 9:
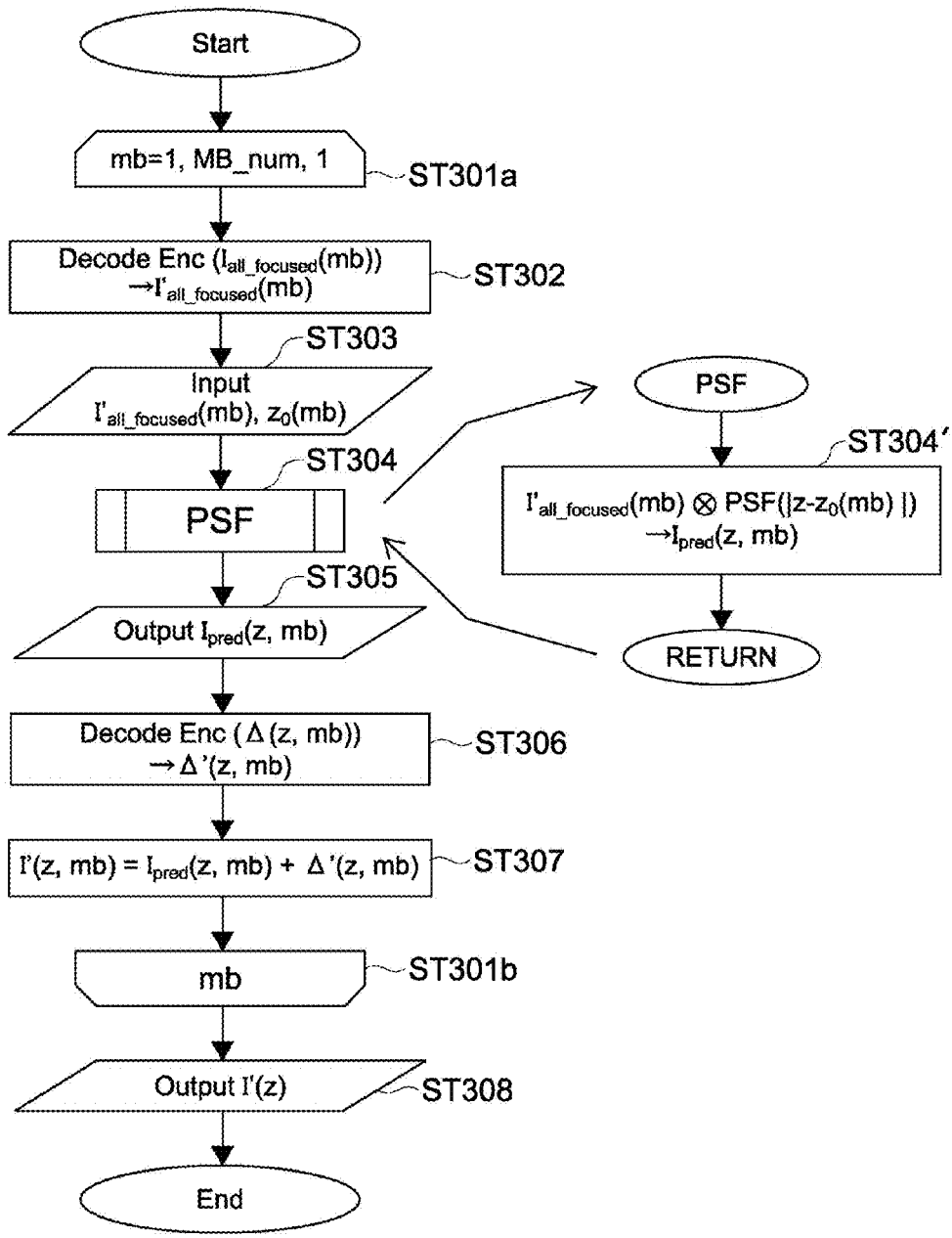
FIG. 9 is a flowchart showing processes for decoding each of the compression-encoded focus face images, by a PC according to a second embodiment of the present invention.

FIG. 9 is a flowchart showing processes for decoding the respective focus face images I (z), by the PC according to the second embodiment.

By a CPU included in the PC according to the second embodiment, processes similar to the operations described from Steps 202 to 205 of FIG. 7 (Step 302-305) are performed. That is, for I'$_{all\_focused}$ (mb) being the decoded representative MB provided with the number mb, a blur compensation based on the positional coordinate z₀ (mb) is performed, and then Ipred (z, mb) being the blur-compensation predicted MB is output.

Next, Enc (Δ (z, mb)) being the encoded differential MB of the encoded differential image Enc (Δ (z)) stored in the storage portion or the like is decoded, and Δ' (z, mb) is generated as the differential MB after the decoding (Step 306).

I' (z, mb) is generated as an additional MB of Ipred (z, mb) being the blur-compensation predicted MB generated in Step 305 and of Δ' (z, mb) being the above-mentioned differential MB (Step 307). This I' (z, mb) being the additional MB is one that is obtained through decoding the MB provided with the number mb of the focus face image I (z). That is expressed by the following expression.

$$I'(z,mb) = I_{pred}(z,mb) + \Delta'(z,mb)$$ [Expression 5]

Through returning to Step 301a from Step 301b, with respect to all numbers mb, the above-mentioned processes are performed, and the focus face image I' (z) is output as a decoded image of the focus face image I (z) (Step 308). The above-mentioned processes are performed in each positional coordinate z, and thus a plurality of focus face images I (z) are decoded.

As described above, in the image processing apparatus (PC) according to the second embodiment, the decoded differential image Δ (z) and the blur-compensation predicted image Ipred (z) are added to each other for each MB, and thus the focus face image I' (z) being the additional image is generated as the decoded image of the focus face image I (z). Thus, in order to decode an arbitrary focus face image I (z), it is sufficient to refer to the decoded all-in-focus image $I'_{all\_focused}$, and it is unnecessary to decode other focus face images I (z). With this, it is possible to decode a plurality of focus face images I (z) at different focus positions for a short processing time. As a result, the operation of rotating the slow-motion focus screw of the optical microscope and the similar operation thereof can be easily realized with a good operability.

It should be noted that by the PC 100 described in the first embodiment, it is possible to perform the decoding of the plurality of focus face images I (z) as described in the second embodiment.

Third Embodiment

Figure 10:
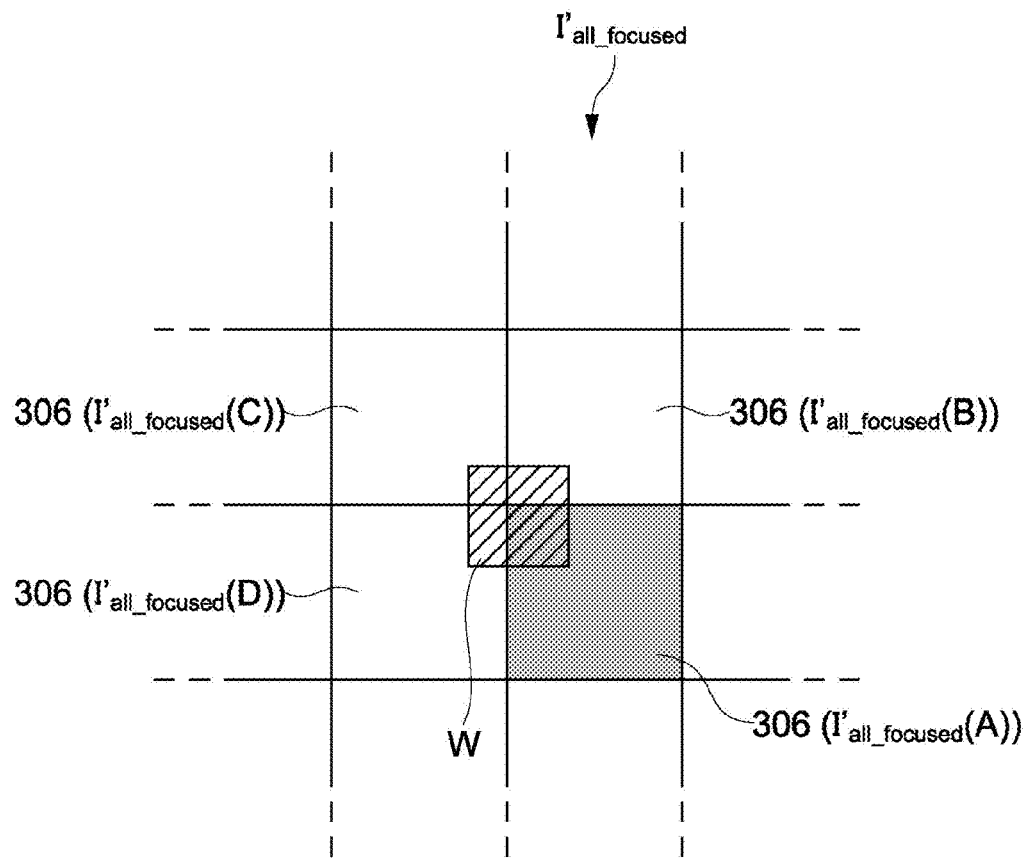
FIG. 10 is an explanatory view for an application of a blur compensation filter with respect to a representative MB according to a third embodiment of the present invention.

FIG. 10 is an explanatory view for an application of a blur compensation filter with respect to a representative MB according to a third embodiment of the present invention.

As shown in FIG. 10, to $I'_{all\_focused}$ (A) being an MB 306 of the decoded all-in-focus image $I'_{all\_focused}$, the blur compensation filter PSF ($|z-z_0$ (A)|) is applied. At this time, also to a boundary region W between $I'_{all\_focused}$ (A), and $I'_{all\_focused}$ (B), $I'_{all\_focused}$ (C), and $I'_{all\_focused}$ (D), which are other representative MBs 306 adjacent to $I'_{all\_focused}$ (A), the blur compensation filter PSF ($|z-z_0$ (A)|) depending on I'all_focused (A) is applied. That is, in $I'_{all\_focused}$ (B), $I'_{all\_focused}$ (C), and $I'_{all\_focused}$ (D), to regions, which are not included in the boundary region W, the blur compensation filter PSF ($|z-z_0$ (B)|), the blur compensation filter PSF ($|z-z_0$ (C)|), and the blur compensation filter PSF ($|z-z_0$ (D)|) are applied, respectively. Further, to regions included in the boundary region W, the blur compensation filter PSF ($|z-z_0$ (A)|) is applied as described above. Then, Ipred (z, A), Ipred (z, B), Ipred (z, C), and Ipred (z, D), which are the blur-compensation predicted MBs, are generated.

As described above, the blur compensation filter is applied to each of the representative MBs 306, and at the same time, the above-mentioned blur compensation filter PSF ($|z-z_0$ (A)|) is applied to the boundary region W of the representative MBs 306 adjacent to each other. With this, it is possible to prevent a problem such as folding or aliasing due to discontinuity in MB boundaries, which may be caused when the blur-compensation prediction is performed for each of the representative MBs.

In the third embodiment, for a boundary-region blur-compensation prediction, the blur compensation filter PSF ($|z-z_0$ (A)|) is applied to the boundary region W. However, not the blur compensation filter PSF ($|z-z_0$ (A)|), but any one of the blur compensation filter PSF ($|z-z_0$ (B)|), the blur compensation filter PSF ($|z-z_0$ (C)|), and the blur compensation filter PSF ($|z-z_0$ (D)|) may be applied to the boundary region W. Alternatively, a blur compensation filter different from the blur compensation filter applied to each representative MB 306 may be appropriately set to be applied to the boundary region W.

Fourth Embodiment

Figure 11:
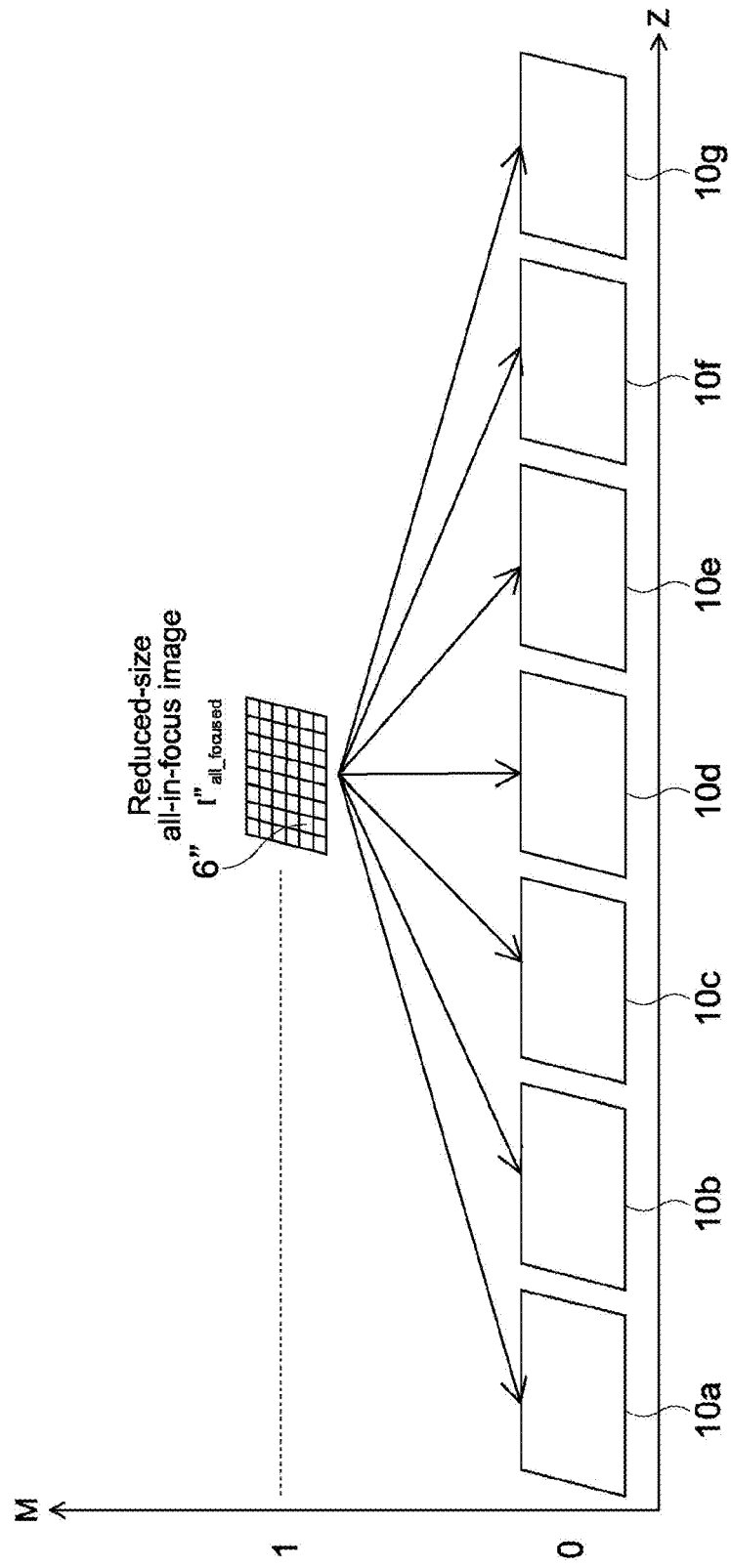
FIG. 11 is an explanatory view for an outline of a compression encoding of a plurality of focus face images according to a fourth embodiment of the present invention.

FIG. 11 is an explanatory view for an outline of a compression encoding and a decoding of a plurality of focus face images I (z) according to a fourth embodiment of the present invention.

In the fourth embodiment, a reduced-size all-in-focus image $I''_{all\_focused}$ having a resolution ratio of M=1 is stored in a storage or the like of a PC. When the reduced-size all-in-focus image $I''_{all\_focused}$ is referred to, a plurality of focus face images I (z) having a resolution ratio of M=0 are compression-encoded or decoded.

The reduced-size all-in-focus image $I''_{all\_focused}$ is generated through reducing the size of the all-in-focus image $I_{all\_focused}$ shown in FIG. 4. Otherwise, the reduced-size all-in-focus image $I''_{all\_focused}$ may be generated based on a reduced-size focus face image I" (z) having a resolution ratio of M=1, which is included in each of the image pyramid structures 4a to 4g shown in FIG. 3.

With respect to each of reduced-size representative MBs 6" of the reduced-size all-in-focus image $I''_{all\_focused}$, an enlarging filter and the blur compensation filter PSF including, for example, Lanczos are applied, a blur-compensation predicted image having a resolution ratio of M=0 is generated. A difference between each of the focus face images I (z) and the blur-compensation predicted image, which have a resolution ratio of M=0, is calculated, to thereby generate the differential images 10a to 10g each having a resolution ratio of M=0.

When the focus face images I (z) are decoded, the blur-compensation predicted images each having a resolution ratio of M=0 are generated based on the reduced-size all-in-focus image $I''_{all\_focused}$ as described above. Then, each of the blur-compensation predicted images and each of the differential images 10a to 10g each having a resolution ratio of M=0 are added to each other. Thus, a plurality of focus face images I (z) each having a resolution ratio of M=0 are decoded.

As described above, the reduced-size all-in-focus image $I''_{all\_focused}$ each having a low resolution ratio is used, and hence it is possible to reduce a memory size for holding the reduced-size all-in-focus image $I''_{all\_focused}$. Further, when the reduced-size all-in-focus image $I''_{all\_focused}$ is encoded and stored in the storage portion or the like, it is possible to reduce a processing amount of the CPU at the time of decoding the reduced-size all-in-focus image $I''_{all\_focused}$. It should be noted that the resolution ratio of the reduced-size all-in-focus image $I''_{all\_focused}$ is not limited to the resolution ratio of M=1, and may be appropriately set.

The image processing apparatus according to each of the above-mentioned embodiments is used in a system of digitalizing images of the cell, the tissue, the organs, and the like of a living organism, which are captured by the optical microscope in order to allow a doctor, a pathologist, or the like to examine the tissue and the like or to diagnose a patient based on the digital images in a medical field or a pathology field, for example. However, the application of the image processing apparatus is not limited to that in the above-mentioned fields, and the image processing apparatus is applicable also in the other fields.

Other Embodiments

Embodiments according to the present invention are not limited to the above-mentioned embodiments, and other various modifications can be made.

In each of the above-mentioned embodiments, the description has been made through exemplifying the PC as the image processing apparatus. However, the scanner apparatus or the like having the optical microscope function may be used as the image processing apparatus according to each of embodiments of the present invention, and a plurality of focus face images may be compression-encoded or decoded by the scanner apparatus or the like.

Figure 12:
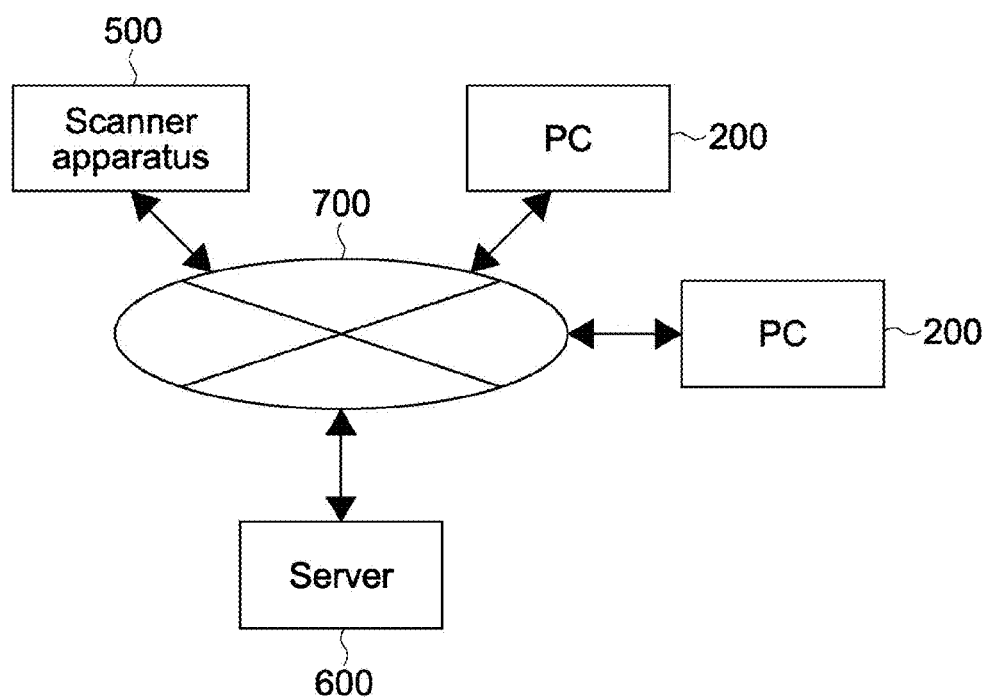
FIG. 12 is a view showing a configuration example of an image processing system according to another embodiment of the present invention.

Further, as shown in FIG. 12, the plurality of focus face images compression-encoded by a scanner apparatus 500 used as the embodiment of the present invention may be stored in another computer or a server 600 other than PCs 200. Further, each of the PCs 200 to be used as a terminal apparatus by a user may access the above-mentioned computer or the server 600, to thereby receive the plurality of focus face images compression-encoded. The plurality of focus face images compression-encoded are decoded by the PC 200. In this case, the PC 200 serving as the terminal apparatus and the server 600 or the like may be connected to each other via a network 700 such as an LAN or a WAN. In particular, it is possible to realize a telepathology, a telediagnosis, or the like when the WAN is used.

The present application contains subject matter related to that disclosed in Japanese Priority Patent Application JP 2010-008989 filed in the Japan Patent Office on Jan. 19, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a receiving means for receiving:
an all-in-focus image generated through selecting, from a plurality of focus face images, representative divided images being best-focused images among images in a plurality of divided regions forming the focus face images, wherein for each of the focus face images correspondingly to the divided regions, the plurality of focus face images are obtained through imaging an object at a plurality of focus positions, and information about the focus positions of the focus face images including the representative divided images; and
a predicted-image generating means for generating a blur-compensation predicted image corresponding to each of the focus face images through performing a blur-compensation prediction using a blur function with respect to each of the representative divided images based at least in part on the information about the focus positions of the focus face images including the representative divided images, the information being received by the receiving means.

2. The image processing apparatus according to claim 1, further comprising:
an all-in-focus image generating means for generating the all-in-focus image through selecting the representative divided images based at least in part on luminance information of the divided region images; and
a differential image generating means for generating a differential image between each of the focus face images and the blur-compensation predicted image corresponding to each of the focus face images, the blur-compensation predicted image being generated by the predicted-image generating means.

3. The image processing apparatus according to claim 2, wherein:
the all-in-focus image generating means generates the all-in-focus image through selecting the representative divided images based at least in part on a contrast of each of the divided region images.

4. The image processing apparatus according to claim 3, wherein:
the predicted-image generating means performs the blur-compensation prediction with respect to each of the representative divided images, and performs a boundary-region blur-compensation prediction with respect to a boundary region between the plurality of representative divided images included in the all-in-focus image, the plurality of representative divided images being adjacent to each other.

5. The image processing apparatus according to claim 4, further comprising a storage means for storing the all-in-focus image and the information about the focus positions of the focus face images including the representative divided images.

6. The image processing apparatus according to claim 5, wherein:
the storage means stores the differential image between each of the focus face images and the blur-compensation predicted image corresponding to each of the focus face images, the blur-compensation predicted image being generated by the predicted-image generating means, and
the image processing apparatus further comprises an additional-image generating means for generating an additional image of the differential image stored in the storage means and the blur-compensation predicted image corresponding to each of the focus face images, the blur-compensation predicted image being generated by the predicted-image generating means.

7. An image processing method executed by an image processing apparatus, comprising:
receiving:
an all-in-focus image generated through selecting, from a plurality of focus face images, representative divided images being best-focused images among images in a plurality of divided regions forming the focus face images, wherein for each of the focus face images correspondingly to the divided regions, the plurality of focus face images are obtained through imaging an object at a plurality of focus positions, and information about the focus positions of the focus face images including the representative divided images; and
generating a blur-compensation predicted image corresponding to each of the focus face images through performing a blur-compensation prediction using a blur function with respect to each of the representative divided images based at least in part on the received information about the focus positions of the focus face images including the representative divided images.

8. An image processing apparatus comprising:
a receiver to receive:
an all-in-focus image generated through selecting, from a plurality of focus face images, representative divided images being best-focused images among images in a plurality of divided regions forming the focus face images, wherein for each of the focus face images correspondingly to the divided regions, the plurality of focus face images are obtained through imaging an object at a plurality of focus positions, and information about the focus positions of the focus face images including the representative divided images; and
a predicted-image generator to generate a blur-compensation predicted image corresponding to each of the focus face images through performing a blur-compensation prediction using a blur function with respect to each of the representative divided images based at least in part on the information about the focus positions of the focus face images including the representative divided images, the information being received by the receiver.

* * * * *